(12) United States Patent
Mendenhall et al.

(10) Patent No.: US 6,272,497 B1
(45) Date of Patent: Aug. 7, 2001

(54) VERTICAL FILTER ARCHITECTURE USING INTERLEAVED MEMORY FOR STORAGE OF PIXEL DATA

(75) Inventors: Todd C. Mendenhall; Gregg Dierke, both of San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/105,243

(22) Filed: Jun. 26, 1998

(51) Int. Cl.[7] .................................................... G06F 17/30
(52) U.S. Cl. ............................ 707/102; 707/4; 707/104; 348/571
(58) Field of Search ................................. 358/160, 571; 707/102, 4, 104

(56) References Cited

U.S. PATENT DOCUMENTS

| | | | | |
|---|---|---|---|---|
| 4,746,980 | * | 5/1988 | Petersen | 358/160 |
| 5,227,863 | * | 7/1993 | Bilbrey et al. | 358/22 |
| 5,428,389 | * | 6/1995 | Ito et al. | 348/231 |
| 5,461,424 | * | 10/1995 | Shimizu | 348/443 |
| 5,552,826 | * | 9/1996 | Hieda | 348/222 |
| 5,671,020 | * | 9/1997 | Law | 348/608 |
| 5,694,177 | * | 12/1997 | Flannaghan et al. | 348/607 |
| 5,818,413 | * | 10/1998 | Hayashi et al. | 345/100 |
| 5,881,205 | * | 3/1999 | Andrew et al. | 386/129 |
| 5,996,105 | * | 11/1999 | Zook | 714/755 |
| 6,008,789 | * | 12/1999 | Anai et al. | 345/99 |
| 6,049,318 | * | 4/2000 | Ota | 345/93 |
| 6,064,450 | * | 5/2000 | Canfield et al. | 348/845 |
| 6,075,572 | * | 6/2000 | Asami | 348/607 |
| 6,088,047 | * | 7/2000 | Bose et al. | 345/517 |

OTHER PUBLICATIONS

Carla Golla, Fulvio Nava, Franco Cavallotti, Alessandro Cremonesi, and Giulio Casagrande, "30–MSamples/s Programmable Filter Processor", IEEE Journal of Solid–State Circuits, vol. 25, No. 6, pp. 1502–1509, Dec. 1990.*

* cited by examiner

Primary Examiner—Jack Choules
Assistant Examiner—Cheryl Lewis

(57) ABSTRACT

A video filter processes pixel data by storing multiple lines of pixel data in a memory buffer and computes a weighted average of the data using a plurality of multipliers and accumulators. The pixel data which, for example, may represent luminance and/or chrominance values is stored in the buffer in an interleaved fashion. Preferably multiple lines of pixel data is stored in a single buffer, thereby reducing the number of traces that would otherwise be required if a separate buffer was used for each line of pixel data.

11 Claims, 7 Drawing Sheets

VERTICAL FILTER ARCHITECTURE USING INTERLEAVED MEMORY FOR STORAGE OF PIXEL DATA

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to video display systems. More particularly, the present invention relates to filtering pixel data in a video display system. More particularly still, the invention relates to an improved vertical filter that filters pixel data stored in an interleaved format in a memory buffer.

2. Background of the Invention

The consumer electronics industry has experienced a dramatic explosion in product development over the last 20 years. This explosion has been fueled by consumer demand coupled with significant advances in semiconductor technology that have lead to lower cost semiconductor devices incorporating significantly more functionality than previously possible. For example, a hand-held calculator from 20 years ago provided the ability to perform rudimentary mathematical operations. Today, a hand-held device can provide much of the functionality of a desktop computer system.

The visual display of information to the user is of particular importance to the consumer electronics industry. The most notable examples of visual displays include televisions and personal computers. Other types of consumer electronics, including stereo receivers and handheld computers, also include visual displays. FIG. 1, for example, shows a typical video monitor 20 such as may be used in television or personal computer systems. As shown, the display includes a grid of pixels 22, each pixel represented by an "X." A typical television pixel format includes 480 rows, or lines, of pixels arranged in 720 columns of pixels for a total of 345,600 pixels.

Each pixel depicted in FIG. 1 is represented by one or more data values. For example, each pixel can be represented in a "RGB" format comprising red, green, and blue color components. Often, each red, green, and blue component is represented by an eight-bit value, thus requiring 24 bits to represent the entire RGB pixel value. Alternatively, each pixel can be represented in a "YUV" or "YCrCb" format. In either the YUV or YCrCb formats, the "Y" value represents luminance ("luma") which determines the brightness of the pixel. The U and V values represent chrominance ("chroma") components which determine color and are calculated as the difference between the luminance components and the red and blue color values; that is, U=Y−R and V=Y−B. The Cr and Cb values also represent chrominance and are scaled versions of the U and V chrominance values.

The image displayed on a television monitor in each instance of time thus includes approximately 350,000 pixels of information with each pixel represented by 24 bits (i.e., three bytes) of RGB or YCrCb values before conversion to be a format compatible with the television (such as the NTSC signal format). In a television format, 30 frames of video are shown on the screen each second. Because of the extraordinary volume of data represented by moving pictures, compression and encoding techniques are important for the transmission and storage of video. Once such compression technique is implemented by the MPEG standard ("Moving Pictures Experts Group"). MPEG is a technique for compressing and encoding video and audio data for storage on a storage medium, transmission via a satellite, or other situations in which it would be desirable to reduce the size of the video and audio information.

The MPEG standard represents a set of methods for compression/encoding and decompression/decoding of full motion video images. MPEG compression uses both motion compensation and discrete cosine transform ("DCT") processes, among others, to yield relatively high compression ratios. The YCrCb format for representing pixel color is the format specified by the MPEG standard.

The two predominant MPEG standards are referred to as MPEG-1 and MPEG-2. The MPEG-1 standard generally concerns inter-field data reduction using block-based motion and compensation prediction ("MCP"), which generally uses temporal differential pulse code modulation ("DPCM"). The MPEG-2 standard is similar to the MPEG-1 standard, but includes extensions to cover a wider range of applications, including interlaced digital video, such as high definition television ("HDTV").

The MPEG format thus specifies various techniques for compressing motion video images. To display those images on a television or computer screen, the compressed images must be decompressed and then decoded and further processed. The processing steps required after the images are decoded include one or more filtering steps. Video processing systems, such as, for example, digital video disk (DVD) systems, usually include both horizontal and vertical filters. Horizontal filters process pixel data across a horizontal row of pixels. Vertical filters process pixel data along a vertical column of pixels.

It is often desirable to horizontally and vertically filter video data to change a video image from one "aspect ratio" to another aspect ratio. The aspect ratio refers to the ratio of the number of columns of pixels to the number of rows of pixels. Thus, for example, the aspect ratio of the display illustrated in FIG. 1 is 720/480, alternatively stated as 4:3. The 4:3 aspect ratio is standard for the television format. Films to be shown in movie theaters, however, typically are recorded using a 16:9 (i.e., 720 by 360 pixels) aspect ratio. Because of the difference in aspect ratios between the way a film is originally recorded and stored digitally and the aspect ratio of television monitors, it is desirable to convert MPEG video from one aspect ratio to another when showing a 16:9 aspect ratio film on a 4:3 aspect ratio monitor. This conversion process generally requires vertical filtering to convert 360 lines of video to 480 lines, or vice versa. There are numerous other situations in which vertical filtering is required.

Vertical filtering generally requires combining or otherwise processing one line of pixel values with one or more other lines of pixel values. It is often desirable, particularly with respect to the luma component of each pixel to which the human eye is more sensitive, to vertically filter four lines of pixel data at a time to reduce the vertical size of a video image. Referring now to FIG. 2, in conventional video processing systems, such as those implemented in DVD drives, the filtering components for processing four lines of pixel data at a time generally include four line buffers (line buffers 1–4) and a filter. Each line buffer includes sufficient memory capacity to store all of the luma values associated with a single line of the image. Thus, if the image includes lines containing 720 pixels, each line buffer has the capacity to store 720 luma values. The filter receives one or more luma components from each line buffer, processes those luma values, and outputs a resulting filtered luma component to be drawn on the display. Once all of the luma components for the four lines of video are filtered, the next four lines of video are then stored in the line buffers. This process is repeated until the entire frame of video has been vertically filtered.

Referring still to FIG. 2, each line buffer requires interfaces to an address bus (ADR), an input data bus (DATA IN), and an output data bus (DATA OUT). Each of the three busses connected to each line buffer includes multiple digital signals. For example, the address bus typically comprises seven bits and each data bus comprises 64 bits. Accordingly, 71 signal "traces" must be routed to each line buffer just for the address and data busses. Other traces are also routed to each line buffer to permit the use of the buffer. The line buffers and filter shown in FIG. 2 typically are implemented inside a semiconductor device (i.e. an "integrated circuit") which includes numerous other functional components.

Semiconductor devices are typically constructed of silicon or other suitable semiconductor material and include tens or hundreds of thousands of microscopically-small transistors implemented in an integrated circuit (IC). Thus, the line buffers 1–4 and filter of FIG. 2 generally are constructed of transistors fabricated from silicon comprising the IC. The address, data and other control signal traces must be routed to each line buffer independently. The relatively large number of traces that must be routed to and between each line buffer leads to routing congestion, and thus the line buffers must be spaced sufficiently apart on the silicon substrate to provide enough room for the traces. As a result, the line buffers and associated traces collectively occupy a considerable surface area in the IC.

It is generally desirable to produce semiconductor devices, in which space is a premium, that incorporate a great deal of functionality in relatively little space. Accordingly, smaller IC's permit more room for other components on a circuit board on which the IC is mounted. Further, smaller IC's generally consume less power than larger devices. The present invention generally relates to an improved vertical filter architecture that can be implemented with smaller semiconductor devices than previously possible.

One possible solution to this space problem involves the use of smaller line buffers (i.e., line buffers that have less memory storage capacity) in the IC. This approach, however, places an increased burden on the address and data busses to transfer more data per unit time to be able to produce output data at the same desired rate. In many filtering operations, a line of pixel data is used more than once. Using smaller buffers may necessitate multiple reads of the same line of data from system memory. Thus, making smaller line buffers helps to reduce the size of the IC, but requires address and data busses that have a higher bandwidth than in conventional devices. Higher data bandwidths undesirably lead to increased temperature generation. Further, simply making the line buffers smaller does not avoid the need to route signal traces to each line buffer from the address and data busses. Accordingly, even with smaller line buffers, the line buffers still must be separated sufficiently to provide clearance for the interconnecting signal traces.

Thus, a video system that includes a vertical filter architecture that solves the problems noted above would be highly beneficial. Such a vertical filter architecture should minimize the surface area required for the filter in the semiconductor device in which it is implemented, while also minimizing the bandwidth required on the address and data busses to transfer the pixel data to and from the buffers. Despite the advantages such a system would offer, to date no such system is known to exist.

BRIEF SUMMARY OF THE INVENTION

The deficiencies noted above are solved in large part by a video filter that filters pixel data from multiple lines of screen pixels. The filter generally includes a memory buffer and at least one multiplier/accumulator. The buffer is used to store pixel data corresponding to multiple lines of pixels. Preferably, only a single buffer is used to store pixel data, although multiple buffers can be used to store different types of pixel data (i.e., one buffer for luminance values and other buffer for chrominance values).

In accordance with the preferred embodiment, the pixel data is stored in the memory buffer in an interleaved configuration. Each row of storage in the buffer preferably stores pixel data corresponding to pixels from a portion of a line of pixels on a display. Adjacent or contiguous rows of storage in the buffer hold pixel data corresponding to different lines of pixels.

In one embodiment, for example, the filter processes pixel data from four lines of pixels. Each pixel line is divided into subsets and interleaved into the buffer. The first subset from the first line is stored in one word of the buffer. The first subset from the second line is then stored in the next adjacent memory word. This process continues until the first subset from the third and fourth lines have been stored in the buffer. Then, the second subset from the first pixel line is stored in the buffer in the next adjacent available memory word. This process repeats until all four lines have been written into the buffer. The multiplier/accumulators preferably compute a weighted average of the pixel data retrieved from the buffers. The averages are calculated for corresponding subsets from each of the pixel lines. Storing the pixel line subsets in an interleaved configuration facilitates retrieval of the data for averaging. Further, using a single memory buffer, rather than separate buffers for each line of pixels, advantageously permits the buffer to occupy less surface on the printed circuit board or integrated circuit substrate.

These and other advantages will become apparent once the following disclosure and accompanying drawings are read.

BRIEF DESCRIPTION OF THE DRAWINGS

A better understanding of the present invention can be obtained when the following detailed description of the preferred embodiment is considered in conjunction with the following drawings in which.

Certain terms are used throughout the following description and claims to refer to particular system components. As one skilled in the art will appreciate, video system companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . .". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE INVENTION

Figure 3:
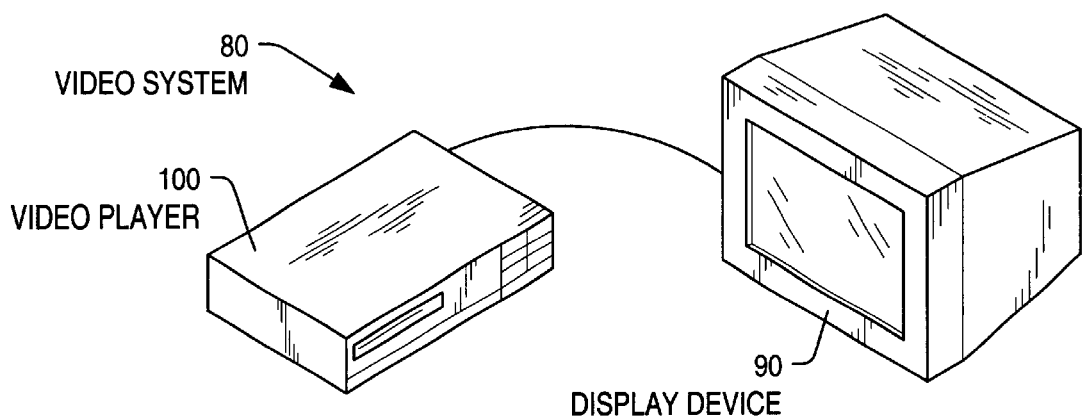
FIG. 3 shows a DVD drive connected to a display.

Referring now to FIG. 3, video system 80 constructed in accordance with the preferred embodiment generally includes a display device 90 coupled to a video player 100. Video player 100 will be described throughout this disclosure as a digital video disk (DVD) system. The principles of the present invention, however, can be applied to other types of digital video equipment such as digital video set-top boxes. Moreover, the invention can be adapted to any type of video equipment that includes vertical filtering of digital pixel data. Display device 90 preferably is a television set or other type of monitor. Further, DVD system 100 could be incorporated into a personal computer system and thus could be coupled to a computer display.

Figure 4:
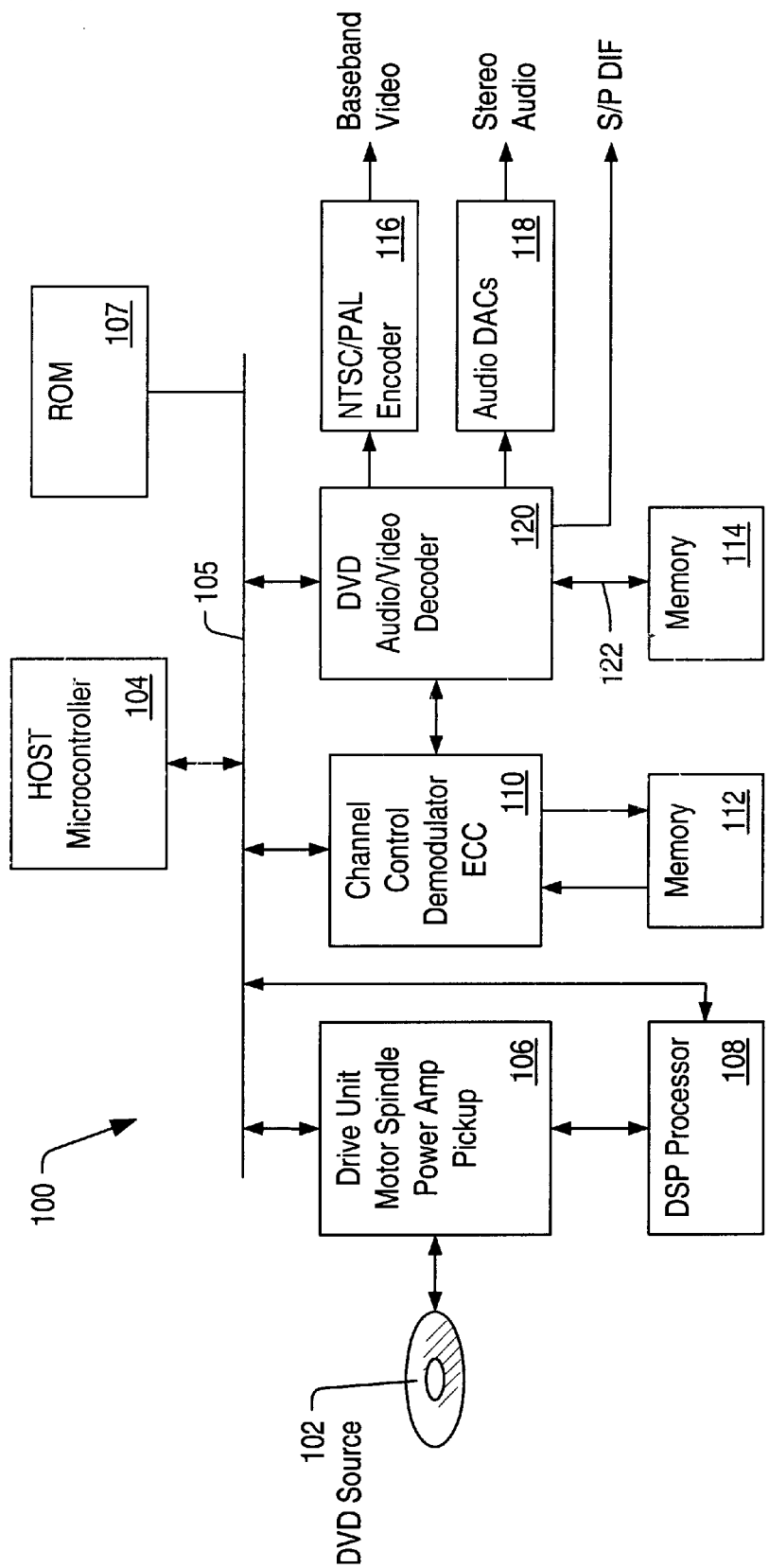
FIG. 4 is a block diagram of the DVD drive of FIG. 3 constructed in accordance with the preferred embodiment.

Referring now to FIG. 4, DVD system 100 preferably includes a host microcontroller 104, a drive unit motor/spindle power amplifier/pickup 106, read only memory (ROM) 107, a DSP processor 108, a channel controller demodulator/ECC 110, memory 112, memory 114, NTSC/PAL encoder 116, audio digital-to-analog converters 118, and a DVD audio/video decoder 120. Alternatively, the audio and video processing functions of audio/video decoder 120 can be implemented with separate devices. Thus, audio/video decoder 120 can be replaced with a video processor, and an audio processor could be included as part of DVD drive 100 as a separate component.

The host microcontroller 104 couples to the drive unit motor spindle power amplifier pickup 106, DSP processor 108, channel control demodulator/ECC 110, and DVD audio/video decoder 120 via a bus 105 which includes data and address busses and status and control signals. The bus is implemented with any suitable protocol commonly available or custom designed. In accordance with the preferred embodiment, DVD system 100 is capable of receiving and processing MPEG video and audio data. The DVD system can implement either the MPEG-1 or MPEG-2 decoding techniques. Alternately, DVD system 100 can be adapted to process data compressed according to other techniques besides MPEG if desired.

A DVD disk 102 can be inserted into DVD system 100. The DVD audio/video decoder 120 generally receives demodulated, coded audio and video data from the DVD disk 102 through the channel control demodulator/ECC 110 and produces a decoded audio and video output data stream to the NTSC/PAL decoder 116 (for video) and audio digital-to-analog converters 118 (for audio). The DVD audio/video decoder 120 also provides a Sony/Philips digital interface (S/P DIF) formatted output stream which is a format commonly known to those of ordinary skill.

The host microcontroller 104 preferably can be any general purpose microcontroller, such as those made by Intel or Motorola. The host microcontroller 104 generally controls the operation of the DVD system. The microcontroller 104 executes an initialization routine to test the system's components during power up and responds to functions selected by the user through input controls (not shown).

The memory 114 preferably is implemented as synchronous dynamic random access memory (SDRAM), although other types of memory devices can be used as well, such as conventional DRAM and extended data out DRAM (EDO DRAM). In accordance with the preferred embodiment, memory 114 comprises a SDRAM device with a 16 Mbit capacity and an 81 MHz clock speed capability. Examples of suitable SDRAM devices include the KM416S1120A manufactured by Samsung or the upD4516161 manufactured by NEC. Further, and if desired, memory 114 may be implemented as two or more SDRAM modules. Thus, if two 16 Mbit SDRAM devices are used, the total memory capacity of memory 114 is 32 Mbits.

The ROM 107 preferably is used to store on-screen display data as well as other configuration information and code. During system initialization, the host microcontroller 104 transfers a copy of the OSD data sets from ROM 107 across bus 105 through the DVD audio/video decoder 120 and into memory 114. The DVD audio/video decoder 120 receives video data from the channel control demodulator/ECC 110 and OSD data from memory 114. The DVD audio/video decoder 120 then mixes the OSD data with the video signals and provides a video output signal to the NTSC/PAL encoder 116.

Drive unit motor motor/spindle power amplifier/pickup 106 generally includes motors to spin the DVD disk 102 and includes read heads to read data from the disk 102. Drive unit motor 106 may also include write heads for writing data to disk 102. Any suitable type of drive unit motor motor/spindle power amplifier/pickup can be used.

Referring still to FIG. 4, the DSP processor 108 provides filtering operations for write and read signals, and acts a controller for the read/write components of the system (not specifically shown). The DSP controller 108 controls the drive motors included in the drive unit motor motor/spindle power amplifier/pickup 106. The DSP processor 108 may be implemented as any suitable DSP processor.

The channel controller demodulator/ECC 110 preferably decodes and buffers the read data from the DVD disk 102 in order to control the rate of the video and audio bitstreams. The channel controller demodulator/ECC 110 also includes an error correction code (ECC) decoder to decode the demodulated signal. Any suitable channel control demodulator/ECC can be used.

The NTSC/PAL encoder 116 receives processed digital video data from audio/video decoder 120 and generally converts the received video bitstream to a predefined analog format. The encoder 116 typically comprises an NTSC/PAL rasterizer for television, but may also be a digital-to-analog converter for other types of video formats. The audio digital to analog converts 118 receive a digital representation of the audio signal from the audio/video decoder 120 and, according to known techniques, converts the signal into an analog audio signal that can be played through a speaker.

Figure 5:
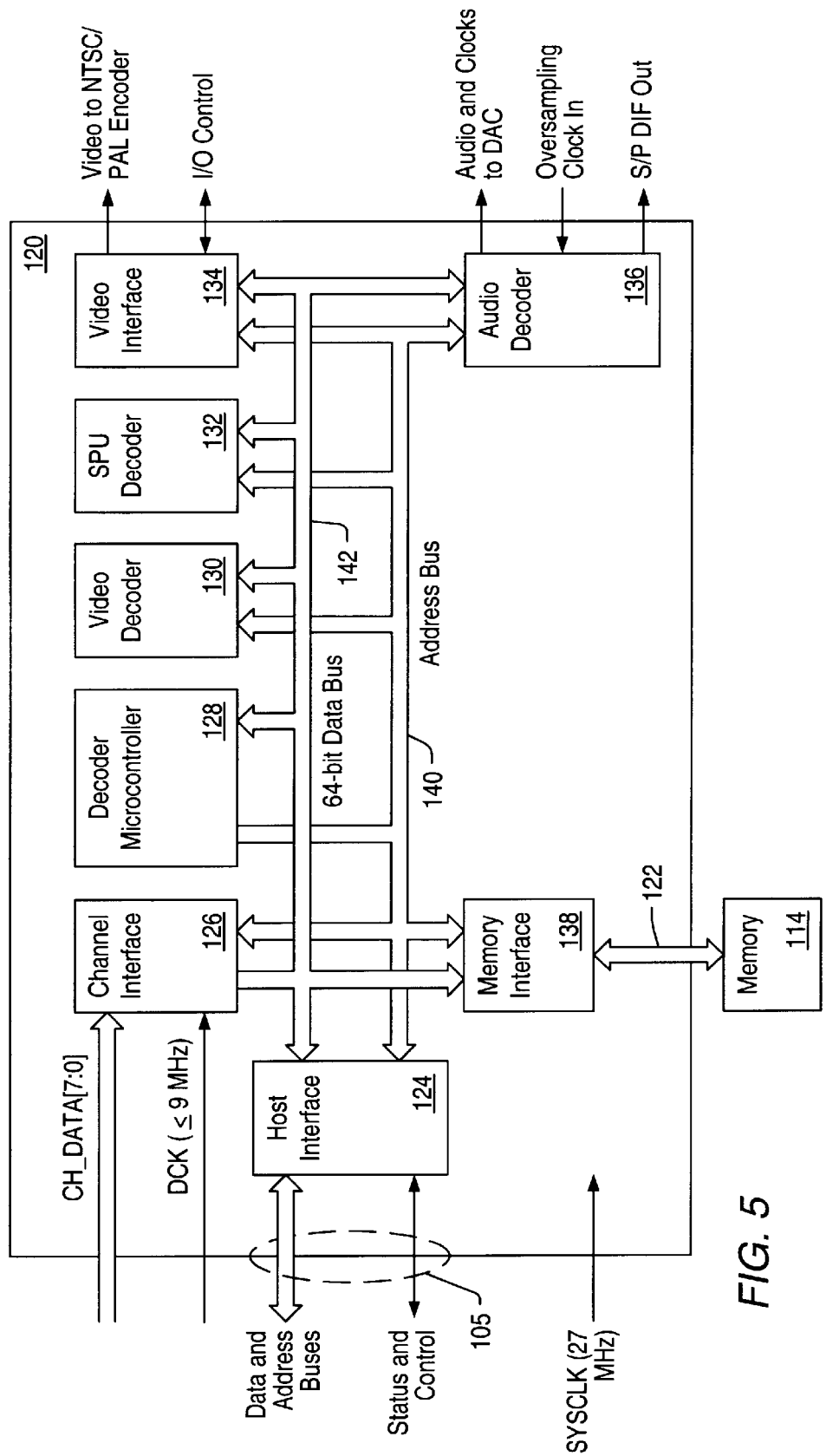
FIG. 5 shows a block diagram of a preferred embodiment of an audio/video decoder included in the DVD drive of FIG. 4.

Referring now to FIG. 5, the audio/video decoder 120 preferably includes a host interface 124, a channel interface 126, a decoder microcontroller 128, a video decoder 130, a sub-picture unit (SPU) decoder 132, a video interface 134, an audio decoder 136, and a memory interface 138. As shown, these components are coupled together via a 64-bit data bus 142 and an associated address bus 140. The interface to the channel control demodulator/ECC 110 is provided by the channel interface 126. The interface to bus 105, and thus host microcontroller 104 is provided by host interface 124. The memory interface 138 provides the interface for the decoder 120 to memory 114. The video interface 134 generates video data to be provided to NTSC/PAL encoder 116 and the audio decoder 136 generates the output digital audio data to be provided to digital-to-analog converters 118. Audio decoder 136 also generates the S/P DIF audio output stream. The following discussion describes functional units depicted in FIG. 4 relevant to the preferred embodiment in greater detail.

The host interface 124 preferably includes registers, read and write FIFO (first in first out) buffer is, and other logic (not shown) to permit the host microcontroller 104 to communicate with the audio/video decoder 120. Communication between the microcontroller 104 and decoder 120 preferably is through the use of the registers in the host interface 124, although other communication techniques can be implemented as well. In accordance with the preferred embodiment, the host microcontroller 104 writes video, audio, and configuration data and other status information to predefined registers and the host interface 124. The decoder 120 continuously or periodically monitors the registers for updated information and responds accordingly. Similarly, decoder 120 communicates information to the host microcontroller 104 through the use of the registers.

Referring still to FIG. 5, the channel interface 126 preferably accepts byte-wide MPEG data streams from the channel control demodulator ECC 110 (FIG. 4) over the CH_DATA[7:0] bus. The channel interface 126 indicates to the channel control demodulator ECC 110 that the channel interface 126 is ready to receive a new byte of encoded video or audio data. When the channel device 110 places the requested data on the CH_DATA bus, the channel device 110 asserts audio or video valid signals, a depending on whether the data to be transferred represents audio or video. These valid signals indicate that the requested data is available to the channel interface 126.

If desired, a DCK clock input signal may be provided to the channel interface 126. If implemented, the DCK signal preferably has a frequency of less than or equal to 9 MHz, although frequencies greater than 9 MHz can also be used. The DCK clock signal preferably is generated by the external channel device 110. The DCK clock signal, in conjunction with the valid signals, is used to write data synchronously to the channel interface 126. When the DCK clock input signal is connected to channel interface 126, the channel interface 126 uses the clock to synchronize the input valid signals before strobing the data into the channel interface 126. This method for inputting data into the channel interface 126 is preferred for connecting external channel devices 110 that do not have clean valid signals. Alternatively, the channel interface 126 can be configured for receiving audio and video data asynchronously. In the asynchronous mode, the DCK clock input pin preferably is grounded and the channel data is placed into the channel interface upon the assertion of request and valid control signals (not shown). As such, the data is not latched into the channel interface 126 synchronously with the DCK clock signal.

The channel interface 126 preferably also strips the packets of headers from the MPEG data stream and writes the header packet data payloads into separate buffer areas in memory 114. The host microcontroller 104 preferably defines a circular buffer within memory 114 by specifying the start and end addresses to each of the buffer areas in registers (not specifically shown). The channel interface 126 manages the reading and writing of each buffer defined in memory 114. When the channel interface 126 strips an item out of the bitstream, the decoder microcontroller 128 retrieves the current write location of the buffer area for that item and writes the item into the buffer.

The video decoder 130 generally receives MPEG video data from memory 114, performs "post-parsing" on the data, decompresses and decodes the data and stores the processed data back in memory 114 in video frame form. The post-parsing process strips off all header information and stores the header information in memory (not shown) for use in the decoding process. The channel interface 126 parses pack, system and packet headers from the MPEG bitstream and stores video packet payloads in memory 114. The preparsed video data is read from the memory 114 into the channel interface 126.

The video decoder 130, along with the decoder microcontroller 128, performs post-parsing by stripping the bitstream apart, and passing the appropriate bits and fields in the stream to the microcontroller 128 for use in picture decoding and reconstruction. The video decoder 130 also decodes layer of syntax in the MPEG bitstream starting from the sequence layer and going through all of the lower layers including the group of picture layer, picture layer, slice layer, macro block layer and block layer, all of which are known to those skilled in the art.

The video decoder 130 also decodes the block layer data per instructions received from the decoder microcontroller 128. The results are placed in the frame stores of memory 114 as picture bitmaps. The video interface 134 reads the picture data from memory 114, mixes it with SPU and OSD video and sends the mixed data to be external NTSC/PAL encoder 116 (FIG. 4). The video decoder 130 also includes buffers that are used to store certain parameters from each of the layers of syntax. The data in these buffers (not specifically shown) is available through the registers included in the host interface 124 described above. In general, this data is useful for controlling the decoder 130.

Referring still to FIG. 5, the SPU decoder 132 decodes SPU bitstreams as defined in the DVD Specification for Read-only Disk. The SPU decoder 132 preferably controls both the memory 114 buffer pointers and various on-chip FIFO pointers. Further, SPU decoder 132 analyzes each SPU command and controls the entire SPU decoding schedule as well as decoding the pixel data compressed by run-length encoding techniques.

The memory interface 138 preferably configures memory 114 into a 512×16-bit page size with a page break penalty of 6 to 7 cycles. The memory interface preferably also implements a column address strobe (CAS) latency of 3 and a burst length of 4. The memory bus 122 preferably comprises a 16-bit data bus, a 12-bit address bus, various chip selects signals and other control signals as would be understood by those of ordinary skill in the art. The memory 114 preferably includes at least one SDRAM device, but may include one or more additional SDRAM's as desired. Many types of data may be stored in memory 114. For example, OSD graphics data, audio and video data, MPEG system header channel data, SPU channel data, and Navi Bank or private stream channel data may be stored in memory 114.

In accordance with the preferred embodiment, the decoder microcontroller 128 controls arbitration to memory 114. Memory arbitration is required because various devices and processes may concurrently require memory access. The arbitration algorithm gives higher priority to some devices requesting memory access and lower priority to others. The arbitration priority preferably favors the MPEG video decoder 130 and channel interface 126. The next highest priority is given to the SPU decoder 132. The next lowest priority is given to the host interface 124, block data move transactions, and direct memory access (DMA) data transfers. Lastly, memory refresh is given lowest priority. Other arbitration schemes can be implemented if desired.

Because the preferred memory configuration is 16 bits wide, the memory interface preferably performs the conversion between the 16-bit memory bus 122 to the 64-bit internal data bus of the audio/video decoder 120. The host microcontroller 104 and the decoder microcontroller 128 address memory 114 assuming an 8-byte wide data transfer configuration. The memory interface 138 changes these addresses to suitable chip selects, bank selects, and column and row addresses for the memory 114.

Figure 6:
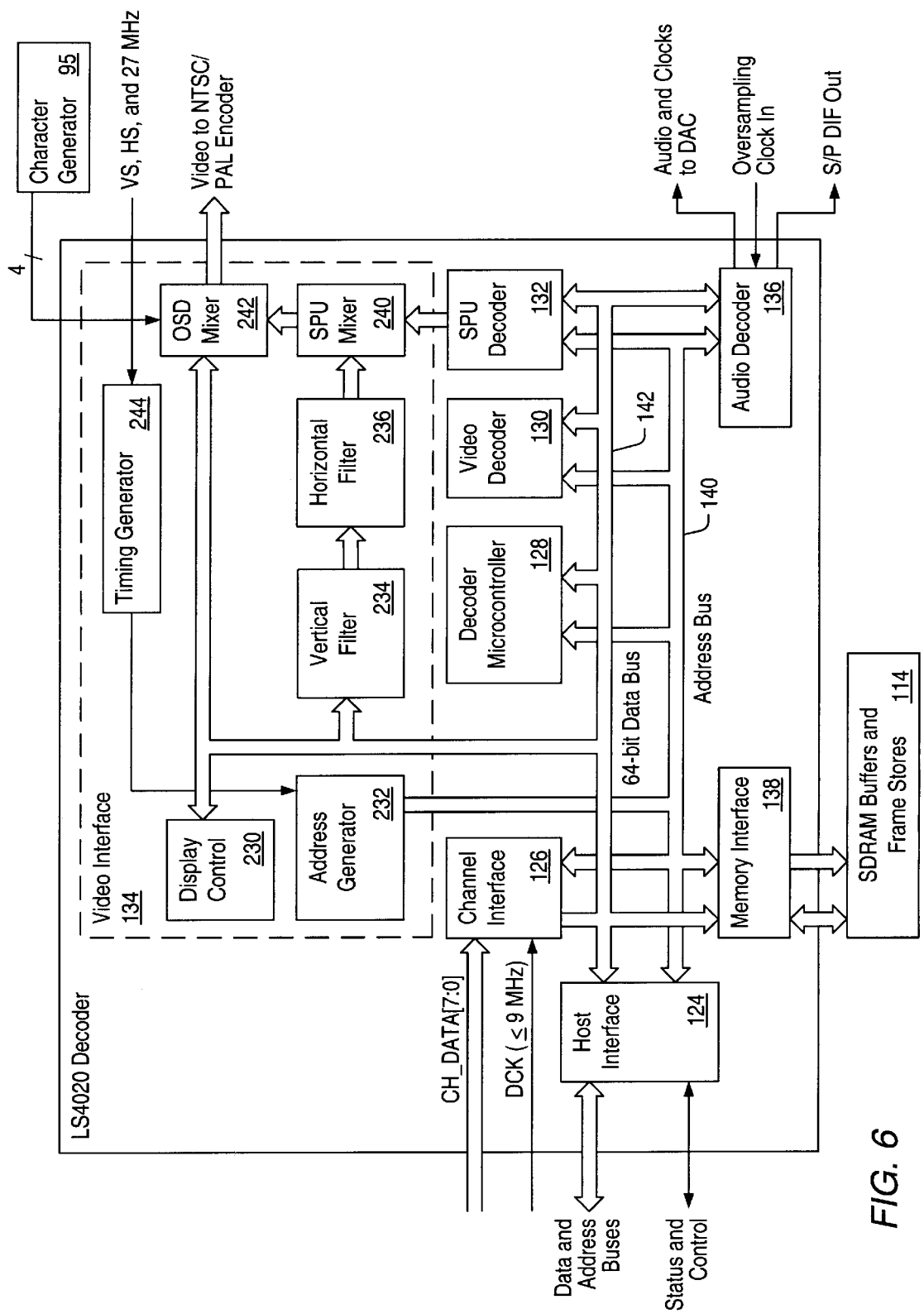
FIG. 6 is a block diagram of a video interface included in the audio/video decoder of FIG. 5.

Referring now to FIG. 6, the video interface 134 preferably includes a display control 230, an address generator 232, a vertical filter unit 234, a horizontal filter unit 236, an SPU mixer 240, an OSD mixer 242, and a timing generator 244. The address generator 232, under control of the timing generator 244, addresses the video frames stored in memory 114 to read pixel data into the post-processing filters 234, 236, and 238. The address generator 232 also commands display control 230 and reads OSD bitmap data into the OSD mixer 242. The post-processing filters 234, 236, and 238 modify the pixel data based on instructions from the display control 230 to perform various video operations such as "letter boxing," "3:2 pulldown, "pan and scan." FIGS. 6 and 7, discussed below, further describe the vertical filter 234.

Figure 2:
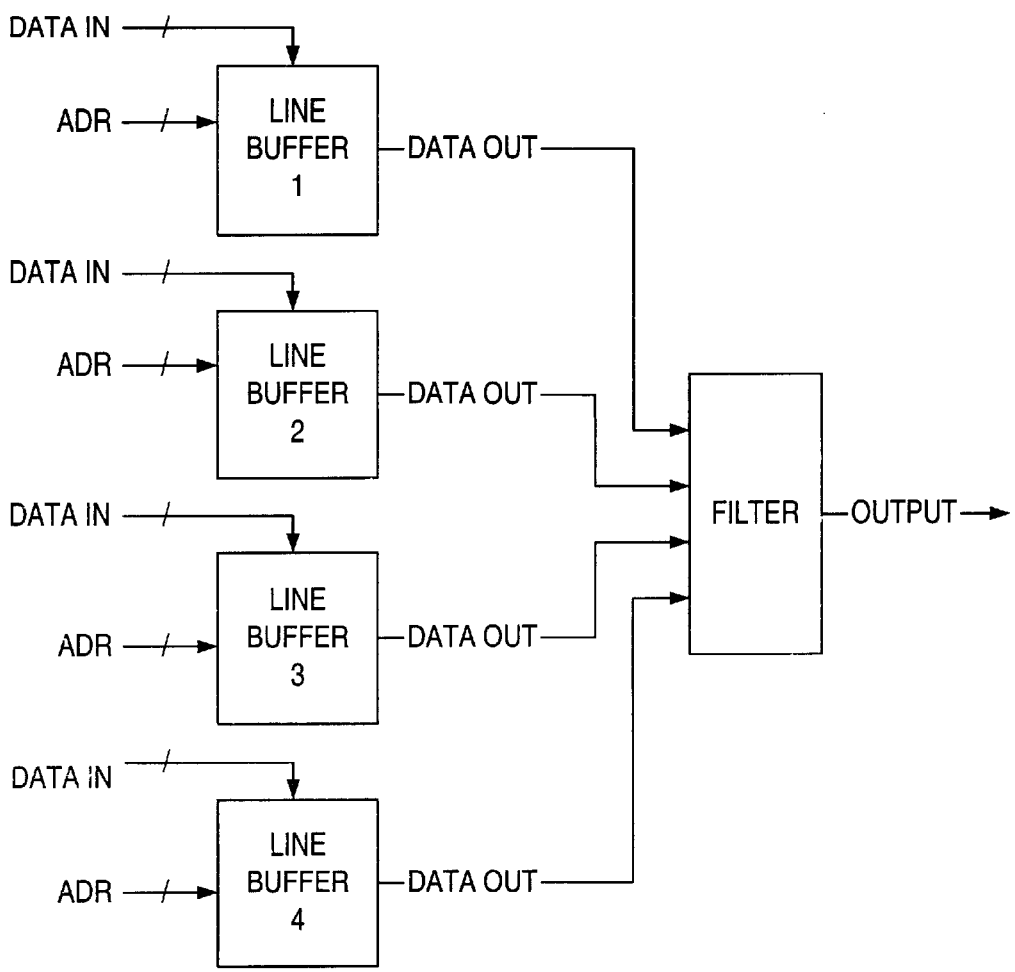
FIG. 2 shows a prior art filtering architecture for vertically filtering screen pixel data using multiple memory buffers.

The display control 230 sets the location of the video image on the display 90 (FIG. 2) with respect to sync signals (not shown) to account for the requirements of several different timing systems and display modes. The output signal from horizontal interpolation filter 238 is then processed by SPU mixer 240 which adds SPU data from the SPU decoder 132 to the video data stream from filter 238.

The OSD mixer 242 mixes together the processed video data from SPU mixer 240 with an OSD image retrieved from memory 114. The output data stream from OSD mixer 242 is then provided to NTSC/PAL encoder 116 (FIG. 4).

Figure 1:
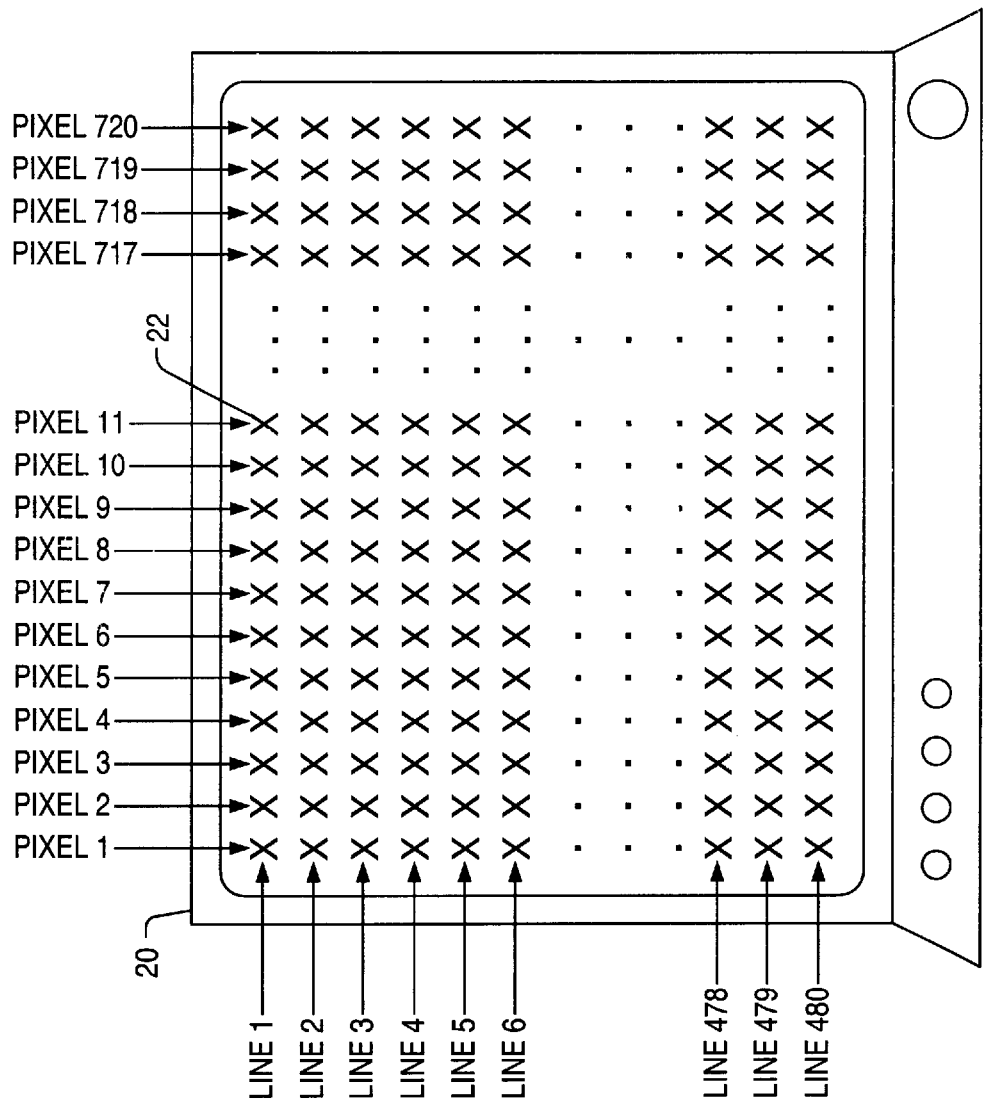
FIG. 1 shows a conventional format of pixels on a television monitor.
Figure 7:
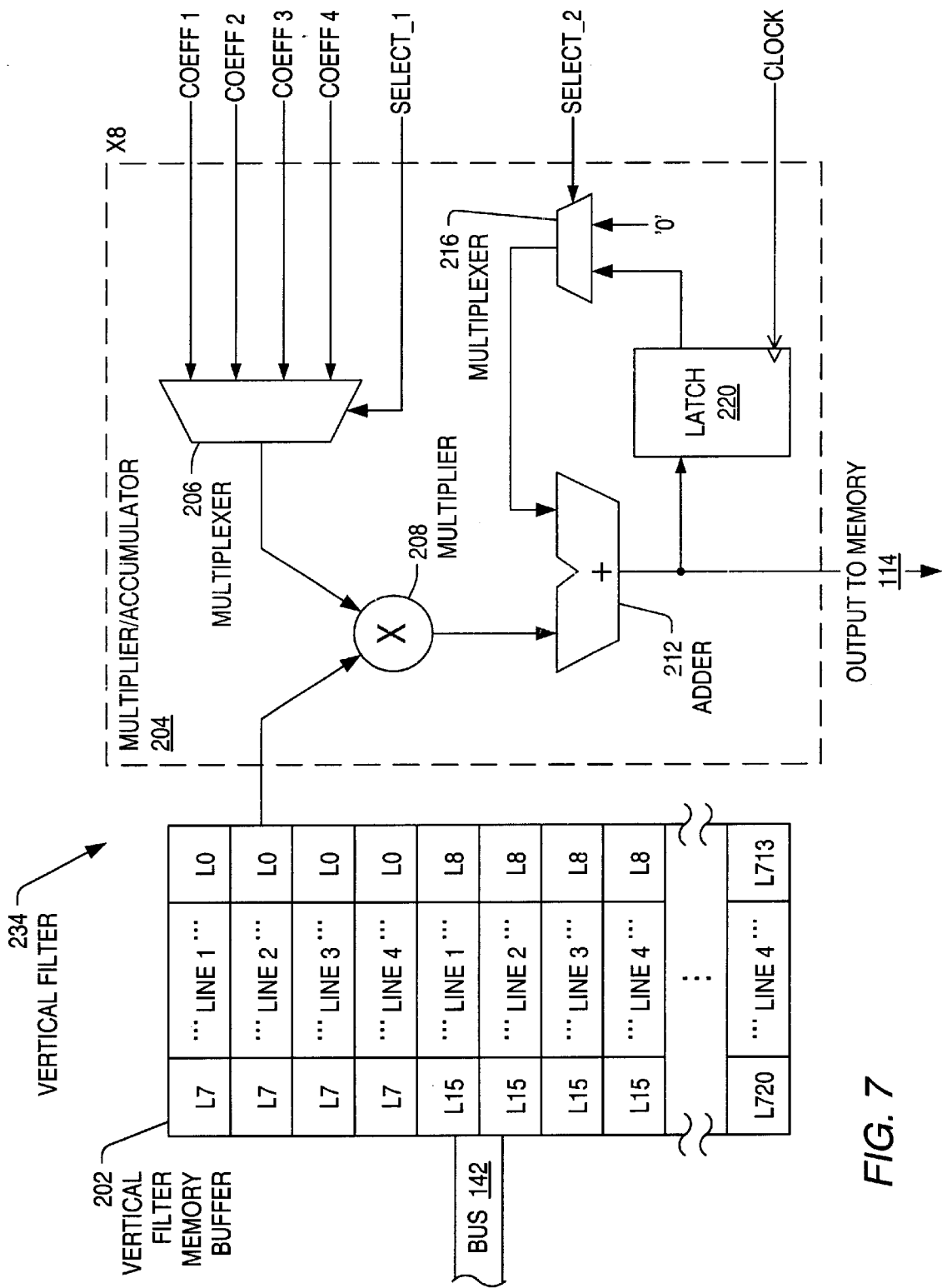
FIG. 7 is an architecture for vertically filtering luma components in accordance with the preferred embodiment using a single memory buffer.

Referring now to FIG. 7, vertical filter 234 generally comprises a memory buffer 202 and a multiplier/accumulator 204 for vertically filtering luma values. In accordance with the preferred embodiment, luma values from system memory 114 are transferred across bus 142 and stored in vertical filter memory buffer 202 in an "interleaved" fashion as shown. Referring now to FIGS. 1 and 7, vertical filter memory buffer 202 preferably includes the capacity to store luma values from four lines of screen pixels. The memory buffer 202 in FIG. 7, for example, shows how the first four lines (LINE 1-LINE 4) of luma values are interleaved into memory buffer 202. The first eight luma values (L0–L7) from the first line of pixels (LINE 1) is stored in the first row of buffer 202. Similarly, the first eight luma values from the second line of pixels (LINE 2) is stored in the second row of memory buffer 202. The first eight luma values from pixel LINES 3 and 4 are stored in the third and fourth row of buffer 202, respectively. As shown, the next four rows of buffer 202 are used to store the next eight luma values (L8–L15) from pixel lines 1–4. The remaining luma values from the first four lines of screen pixels are interleaved into memory buffer 202 in this manner.

In accordance with the preferred embodiment, the vertical filter 234 includes a multiplier/accumulator ("MAC") 204 for each of the eight columns of luma values in buffer 202. Because buffer 202 includes eight luma values in each row, vertical filter 234 preferably includes eight MAC's, although only one is shown in FIG. 7 for sake of clarity. Each MAC 204 calculates a weighted average of the four corresponding luma values from each of the four lines of pixels. For example, a MAC 204 calculates an averages of the L0 lumas from LINES 1–4. Another MAC 204 averages the L1 lumas from LINES 1–4. Six other MAC's 204 average the other six lumas L2–L7 from LINES 1–4. Once the eight MAC's 204 calculate the weighted average of the first eight lumas in LINES 1–4, the same eight MAC's are used to calculate the weighted average of the next set of eight lumas (L8–L15) from the first four pixel lines.

Each MAC 204 preferably includes a multiplexer 206, a multiplier 208, an adder 212, a multiplexer 260, and a latch 220. One of four coefficients, COEFF 1–COEFF 4, is selected through multiplexer 206 to be multiplied by one of the luma values read from buffer 202 by multiplier 208. Each product of luma value and coefficient is added via adder 212 to an accumulated product of previous luma value-coefficient products. The output of adder 212 is latched into latch 220 and routed back into an input of adder 212 via a multiplexer 216. The multiplexer 216 functions to add in an initial zero value to the initial luma value-coefficient product. Multiplexer's 206 and 216 are operated via the SELECT$_{-1}$ and SELECT$_{-2}$ signals. Latch 220 is clocked by a clock signal has indicated in FIG. 7. The coefficient, clock, and selects signals preferably are generated by other logic (not specifically shown) in vertical filter 234.

A multiplier/accumulator architecture shown in FIG. 7 is intended to be a general architecture or for performing most any desired vertical filtering operation. For example, the architecture shown in FIG. 7 can be used to average luma values from a set of four pixel lines following after which the buffer 202 can be loaded with luma values from the next set of four pixel lines. The architecture of FIG. 7 can also be used to calculate the weighted average of luma values from a running and overlapping set of four pixel lines. Accordingly, luma values from the first for pixel lines can be loaded into buffer 202 for averaging by a MAC's 204. Then, the luma values corresponding to pixel LINE 1 can be replaced with the luma values from pixel LINE 5 and the weighted average of luma values from LINES 2–5 can then be calculated. Subsequently, the luma values from pixel LINES 6 scan be written into buffer 202 to replace the luma values from pixel LINE 2 and the weighted average of lumas from lines 3–6 can then be calculated. By providing enough capacity in buffer 202 to store or multiple complete lines of luma values, the memory buffer and multiplier/accumulator of the preferred embodiment permits luma values to be used in the filtering operations more than once without having to retrieve the same luma value from system memory 214. This feature of the preferred embodiment advantageously reduces the bandwidth requirement of bus 122 and 142 (FIG. 5) as compared to video systems which require eight luma value to be retrieved from system memory each time that value needs to be used in a calculation.

Figure 8:
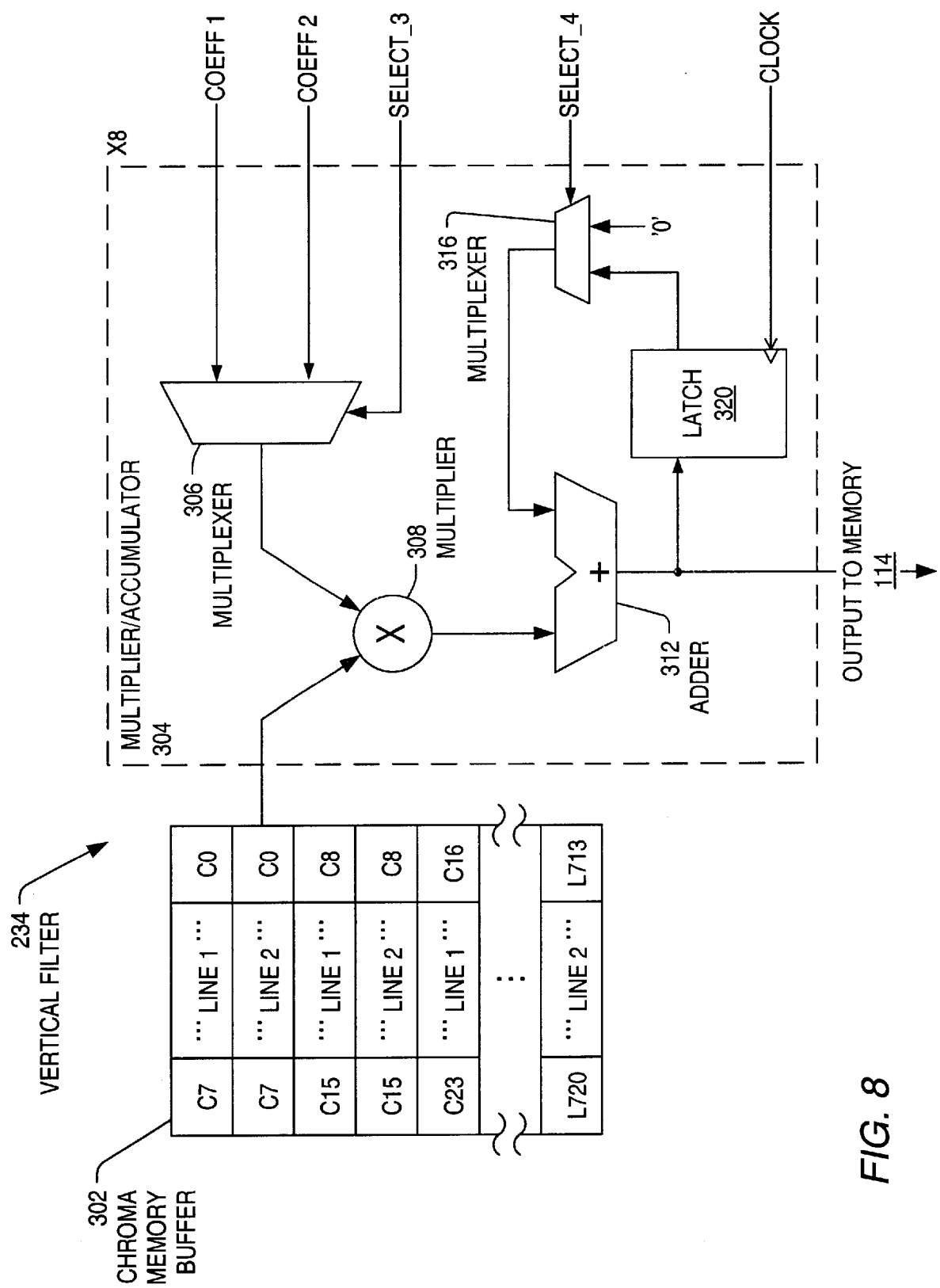
FIG. 8 is an architecture for vertically filtering chroma components in accordance with the preferred embodiment.

The vertical filter 234 shown in FIG. 7 preferably is used to filter or luma values. A similar architecture can be used, if desired, for filtering chroma values, an exemplary embodiment of which is shown in FIG. 8. As shown, vertical filter 234 may include a chroma memory buffer 302 interleaved similarly to luma memory buffer 202 from FIG. 7 and includes a multiplier/accumulator 304 configured similarly to MAC 204 (FIG. 7). As such, each of the eight to MAC's 304 include multiplexers 306 and 316, a multiplier 308, an adder 312, and a latch 320 which all function similarly to the comparable components described above with respect to MAC 204.

The exemplary embodiment shown in FIG. 8 assumes that there are chroma values only for every other line of pixels in FIG. 1 (LINES 1, 3, 5, etc.). Further, the exemplary embodiments of FIG. 8 permits two lines of chroma values to be average together, rather than the four lines of luma values in FIG. 7. Accordingly, only two coefficients, COEFF 1 and COEFF 2, are needed as inputs to multiplexer 306. One of ordinary skill in the art, however, will recognize that many other variations of the architectures shown in FIGS. 7 and 8 are also possible and are consistent with the principles of the present invention. For example, chroma buffer 302 can be configured to store chroma values for every pixel in every line of the screen 20 of FIG. 1 and more than two coefficient values can be used to calculate the weighted average of chroma values, if desired.

Thus, the preferred embodiments of the present invention described above advantageously permits one memory buffer to be used to store all of the luma values required for filtering, rather than having a separate buffer for each line of luma values as in conventional video filters. With only one memory buffer, the filter 234 generally comprises less surface area in a semiconductor device as fewer traces are needed for routing to that buffer.

The above discussion is meant to be illustrative of the principles of the present invention. Numerous variations and modifications will become apparent to those skilled in the art once the above disclosure is fully appreciated. For example, more than one memory buffer can be used to store luma and/or chroma values. It is intended that the following claims be interpreted to embrace all such variations and modifications.

What is claimed is:

1. A method for processing data values representing multiple lines of pixels on a display screen, comprising:

reading said data values from a system memory;

storing subsets of the data values from each of a plurality of said pixel lines in contiguous memory locations in a single memory buffer;

retrieving said data subsets; and calculating a weighted average of said data subsets.

2. The method of claim 1 wherein each storing step includes storing data values from a first portion of one line of pixels in said single memory buffer and contiguously storing data values from a second portion of another line of pixels immediately after said first portion.

3. The method of claim 2, wherein the calculating step includes multiplying said data values by coefficients.

4. The method of claim 3, wherein the calculating step further includes adding the resulting product from said multiplying step to a previously multiplied data value and coefficient.

5. A vertical video filter, comprising:

a memory buffer for storing in sequential memory locations luminance values from portions of a plurality of lines on a display; and a multiplier/accumulator coupled to said memory buffer for combining said luminance values stored in said buffer.

6. The vertical video filter of claim 5 wherein said memory buffer includes multiple rows of storage and is configured to hold eight luminance values in each row.

7. The vertical video filter of claim 6 wherein adjacent rows are used to store eight luminance values from different lines of pixels.

8. The vertical video filter of claim 7 wherein each set of adjacent four rows in said memory buffer is used to store eight luminance values from four different lines of pixels.

9. A vertical video filter, comprising:

a memory buffer for storing in sequential memory locations chrominance values from portions of a plurality of lines on a display; and a multiplier/accumulator coupled to said memory buffer for combining said chrominance values stored in said buffer.

10. The vertical video filter of claim 9 wherein said memory buffer includes multiple rows of storage and is configured to hold eight chrominance values in each row.

11. The vertical video filter of claim 10 wherein adjacent rows are used to store eight chrominance values from different lines of pixels.

* * * * *